United States Patent
Salfity et al.

(10) Patent No.: US 11,703,334 B2
(45) Date of Patent: Jul. 18, 2023

(54) MOBILE ROBOTS TO GENERATE REFERENCE MAPS FOR LOCALIZATION

(71) Applicant: Hewlett-Packard Development Company, L.P., Spring, TX (US)

(72) Inventors: Jonathan Salfity, Palo Alto, CA (US); David Murphy, Palo Alto, CA (US)

(73) Assignee: Hewlett-Packard Development Company. L.P., Spring, TX (US)

( * ) Notice: Subject to any disclaimer, the term of this patent is extended or adjusted under 35 U.S.C. 154(b) by 427 days.

(21) Appl. No.: 16/754,773

(22) PCT Filed: Oct. 31, 2017

(86) PCT No.: PCT/US2017/059396
§ 371 (c)(1),
(2) Date: Apr. 9, 2020

(87) PCT Pub. No.: WO2019/089018
PCT Pub. Date: May 9, 2019

(65) Prior Publication Data
US 2020/0300639 A1  Sep. 24, 2020

(51) Int. Cl.
| | |
|---|---|
| *G01C 21/32* | (2006.01) |
| *G06T 7/11* | (2017.01) |
| *G06T 7/70* | (2017.01) |
| *G01C 21/14* | (2006.01) |
| *G01C 21/16* | (2006.01) |
| *G06V 20/10* | (2022.01) |

(52) U.S. Cl.
CPC ............ *G01C 21/32* (2013.01); *G01C 21/14* (2013.01); *G01C 21/165* (2013.01); *G06T 7/11* (2017.01); *G06T 7/70* (2017.01); *G06V 20/10* (2022.01)

(58) Field of Classification Search
CPC ...... G01C 21/32; G01C 21/14; G01C 21/165; G06T 7/11; G06T 7/70; G06V 20/10; G05D 1/0274; G05D 1/0246
See application file for complete search history.

(56) References Cited

U.S. PATENT DOCUMENTS

| | | | |
|---|---|---|---|
| 8,761,925 B2 | 6/2014 | Yoon et al. | |
| 9,298,183 B2 | 3/2016 | Artes et al. | |
| 9,720,415 B2 | 8/2017 | Levinson et al. | |
| 10,794,710 B1 * | 10/2020 | Liu | ........................ G06V 10/82 |

(Continued)

FOREIGN PATENT DOCUMENTS

| | | |
|---|---|---|
| EP | 1804149 | 7/2007 |
| TW | 201705897 | 2/2017 |

(Continued)

OTHER PUBLICATIONS

Biswas, J., Vector Map-based, Non-markov Localization for Long-term Deployment of Autonomous Mobile Robots, Dec. 2014.

(Continued)

*Primary Examiner* — Jacinta M Crawford
*Assistant Examiner* — Andrew Shin (57) ABSTRACT

An example robot performs a scan to obtain image data of a given region. The robot performs image analysis on the image data to detect a set of undesirable objects, and generates a reference map that excludes the set of undesirable objects, where the reference map is associated with the location of the robot at the time of the scan.

20 Claims, 6 Drawing Sheets

(56) References Cited

U.S. PATENT DOCUMENTS

| | | |
|---|---|---|
| 2015/0073646 A1 | 3/2015 | Rosenstein et al. |
| 2017/0132334 A1* | 5/2017 | Levinson .............. G01S 17/931 |
| 2017/0225321 A1 | 8/2017 | Deyle et al. |
| 2018/0211103 A1* | 7/2018 | Sohn ...................... G05D 1/024 |
| 2019/0050668 A1* | 2/2019 | Cansizoglu .......... G06K 9/6215 |

FOREIGN PATENT DOCUMENTS

| | | |
|---|---|---|
| TW | 201729023 | 8/2017 |
| WO | WO-2017076928 | 5/2017 |
| WO | WO-2017091008 | 6/2017 |

OTHER PUBLICATIONS

Morioka, H., Vision-based Mobile Robot's SLAM and Navigation in Crowded Environments, Sep. 2011, http://ieeexplore.ieee.org/document/6094847/.

Taneja, Aparna et al. "Image based detection of geometric changes in urban environments." In Computer Vision (ICCV), 2011 IEEE International Conference on, pp. 2336-2343. IEEE.

* cited by examiner

MOBILE ROBOTS TO GENERATE REFERENCE MAPS FOR LOCALIZATION

BACKGROUND

In the field of robotics, robots that mobilize in free space typically localize themselves, meaning they determine their own location with respect to a point of reference or reference frame. Mobile robots often utilize reference maps to localize themselves.

DETAILED DESCRIPTION

Examples provide for a robot that generates a reference map for use in enabling the robot (or another robot) perform localization. The reference map may be generated by the robot performing a scan of the given region to obtain image data, and then performing image analysis on the image data to detect and exclude undesirable objects from the reference map.

In some examples, an example robot includes a set of image sensors, a spatial determination resource, a control system and a propulsion mechanism. The control system may operate to perform a scan of a given region and, using the spatial determination resource, determine a location of the robot relative to a reference point at a time of the scan. The robot may perform image analysis on the image data to determine a set of undesirable objects that are depicted by the image data, and generate a reference map that excludes the set of undesirable objects. In such cases, the reference map is associated with the location of the robot at the time of the scan. As described with examples, the reference map can act as a resource to enable the robot (or another robot) to subsequently localize itself as the robot(s) traverses through the given region.

Once a reference map is generated for a given region, a robot (the robot performing localization) can utilize the reference map to determine its location with respect to a reference frame or point. Specifically, the robot may capture image data for a given region, and then compare the current image data to a reference map in order to identify visual landmarks that can form the basis of comparison between the current image and the reference map. The robot performing the localization can then determine its position with respect to a reference frame or point of reference within the given region by comparing features and characteristics depicted by select objects in the current image to features of the same objects depicted in the reference map. By way of comparison, the features and characteristics that can form a basis of comparison include pixel dimensions for respective objects, including for determination of distances between two objects, as well as the general shape or size of depicted objects. By comparing the relative dimension of an object depicted in two images (e.g., the current image and the reference map), the robot may be able to triangulate its own location within a given region relative to a location where image data for the reference map was previously captured.

Examples recognize that localization using reference maps can be computationally expensive for robots. Moreover, sufficient variability may exist in the manner in which robots operate to cause individual robots to misidentify static and persistent objects which can be relied upon with accuracy.

One or more examples described herein may be implemented through the use of instructions that are executable by one or more processors. These instructions may be carried on a computer-readable medium. Machines shown or described with figures below provide examples of processing resources and computer-readable mediums on which instructions for implementing examples described herein can be carried and/or executed. In particular, the numerous machines shown with examples described herein include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

Figure 1:
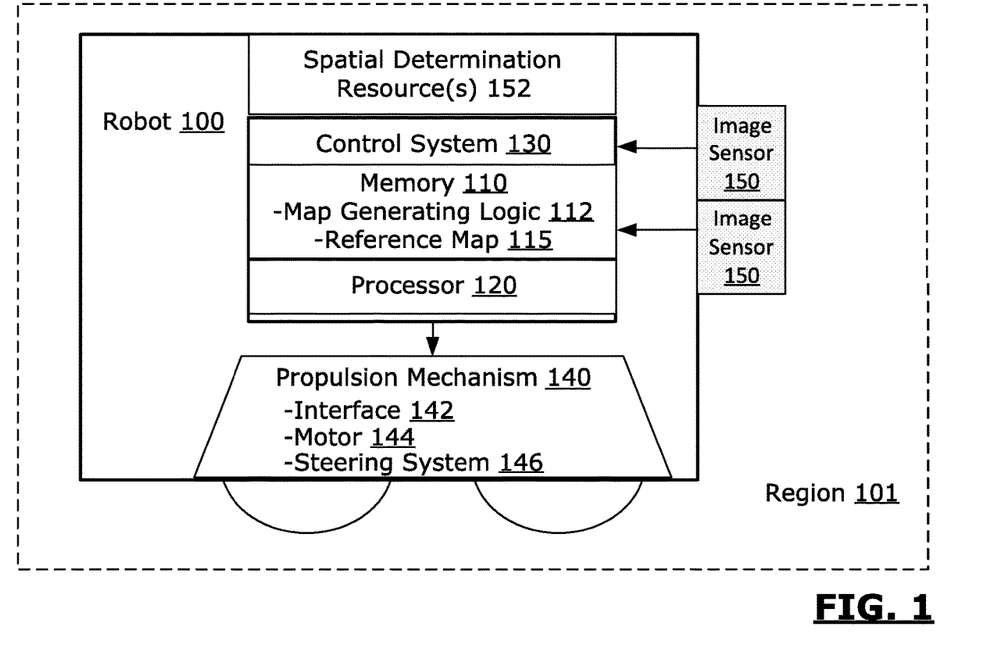
FIG. 1 illustrates an example robot for generating a reference map for use in localization.

FIG. 1 illustrates an example robot for generating a reference map for use in performing localization. In particular, FIG. 1 depicts a robot 100 having a control system 130, a propulsion mechanism 140, a set of image sensors 150, and a spatial determination resource 152. As described, the control system 130 can use the image sensors 152 to obtain image data from a given region 101. The control system 130 may implement map generation logic 112 to generate a reference map 115 from the image data of the given region. In generating the reference map 115, the map generation logic 112 may utilize semantic segmentation to detect and exclude undesirable objects from the reference map 115. The undesirable objects include dynamic objects and static objects which are not inherently persistent in their respective location (e.g., objects which are prone to being moved). As a result, the map generation logic 112 can generate the reference map 115 to include static and persistent objects, rather than objects that are dynamic or not persistently-located. In some examples, the map generation logic 112 can increase the ratio of the number of static and persistent objects which are depicted in a given reference map 115 as compared to the number of non-persistent or dynamic objects. In some implementations, the map generation logic 112 can be implemented to include only those objects which meet a threshold level of confidence with respect to being a static and persistent object of the given region.

In addition to selecting what objects should appear in the reference map 115, the control system 130 also associates a coordinate or location identifier with the location of the robot 100 at the time the reference map 115 is captured. More specifically, the control system 130 determines coordinates or other location identifiers to be specific to the set of sensors from which the reference map 115 is generated. A variety of techniques may be used to determine the location of the robot 100 with respect to a reference frame or point. For example, the robot 100 may be situated in the middle of the given region, or aligned with a marker that is visible to its sensors. Still further, the robot 100 may be equipped with a spatial determination resource 152 to enable the robot to determine its location through self-monitoring. For example, the robot 100 may include movement sensors (e.g., accelerometer, gyroscope and or inertial mass unit (IMU)) which the robot 100 can use to track its own position with respect to a point of reference. As an addition or alternative, the spatial determination resource 152 may correspond to an odometer that can track, for example, wheel turns of the propulsion mechanism 140, as the robot 100 moves from a point of reference having a known location or coordinate (e.g., entryway to a given room). The control system 130 may track the odometer, as well as determine information from the movement sensors, in order to determine its own relative position within the given region 101 at the time when the scan for image data is performed. The control system 130 may then associate the determined location of the robot 100 at the time the scan is performed with the resulting reference map 115 that is generated from the image data of the scan. In this way, the reference map 115 may subsequently be used for localization, by enabling image data to be triangulated into distance information from the location of the robot 100 at the time the scan is performed. The distance information can then be transformed into a coordinate relative to the location of the robot 100 at the time the scan for the reference map 115 was performed.

In some examples, the robot 100 may generate the reference map 115 at a first instance in time, and then use the reference map 115 at subsequent instances in time in order to position itself within a given region and/or reference frame. As an addition or alternative, a robot may communicate the reference map 115 to another robot, or to a library of reference maps. Still further, the robot may update a reference map 115 at any time while using the maps.

Among other benefits, examples recognize that localization under conventional approaches can be computationally expensive and unreliable. For example, the robot performing localization may implement real-time image processing to perform complicated operations for detecting and comparing objects of a current view with objects of a reference map. Such operations can become more computationally intensive and unreliable when the image data of the current view depicts crowded scenes with multiple objects in motion. To alleviate the complexities of such scenarios, the robot 100 may generate the reference map 115 using semantic segmentation to reliably detect dynamic and/or non-persistent objects of a scene. When such objects are detected, they may be excluded from the reference map 115, so that the reference map 115 is less cluttered with unsuitable objects that could potentially generate erroneous localization results when subsequently used.

The propulsion mechanism 140 includes an interface 142, at least one motor 144 and a steering system 146. The interface 142 connects the propulsion mechanism 140 to the control system 130 to enable the propulsion mechanism 140 to receive instructions from the control system 130. The propulsion mechanism 140 may receive instructions as to direction and velocity from the control system 130. The instructions may be used to drive the at least one motor 144 and direct the steering system 146. The at least one motor 144 can include one or multiple motors for propelling the robot. For example, one motor may drive all wheels of the robot 100, or, each wheel may be driven by its own motor, or any other combination of wheels and motors. The steering system 146 may include mechanical components (e.g., axles, linkages, hydraulics, belts, etc.) to manipulate an angle of the wheels (e.g., synchronous drive, articulated drive, etc.), or utilize a velocity difference between multiple motors (e.g., differential drive, etc.), or any combination thereof, to direct the robot 100 according to the instructions received from the control system 130.

The set of image sensors 150 can include one or multiple types of cameras, including three-dimensional image sensing cameras (e.g., cameras a utilize a distance sensor, LiDAR, stereoscopic cameras, etc.). By way of example, the set of image sensors 150 may include a laser sensor that illuminates a target with pulsed laser light, and measures the reflected pulses with a sensor. As another example, the set of image sensors 150 may include a camera sensor that can passively obtain two-dimensional image data. Still further, the set of image sensors 150 may include a pair stereoscopic cameras, that operate in coordination to generate a three-dimensional depiction of a given object in the scene. Three-dimensional information may also be obtained from movement (e.g., structure from motion).

The control system 130 may include a memory 110 and a processor 120. The memory 110 can be of any form (e.g., RAM, DRAM, etc.) and can include map generating logic 112. The map generation logic 112 can include instructions to control the robot 100 as it traverses through an area or region. The map generation logic 112 may also include instructions to enable the robot 100 to generate the map of the areas or regions traversed by the robot 100. The map generation logic 112 may also include data (e.g., models, images, templates, etc.) to be referenced by the control system 130 during the map building process to assist in determining the identity of objects detected by the robot 100, as well as determining a predetermined classification for each of the detected objects. The processor 120 may access the map generation logic 112 from the memory 110 to control the robot 100 and generate the reference map 115. In addition, as shown in FIG. 1, the control system 130 may be integrated with the robot 100 (e.g., using hardware, firmware and/or software). More generally, the map generation logic 112 may be implemented as a control system 300, such as shown with an example of FIG. 3. The control system 300 may be implemented either with the robot 130 or remote from the robot 100.

Figure 2A:
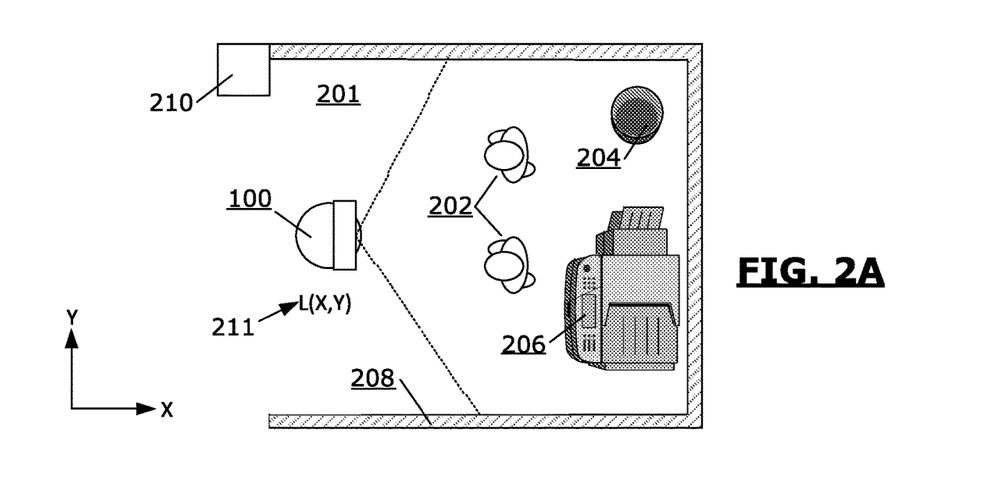
FIG. 2A through FIG. 2C illustrate examples of a robot generating a reference map.
Figure 2B:
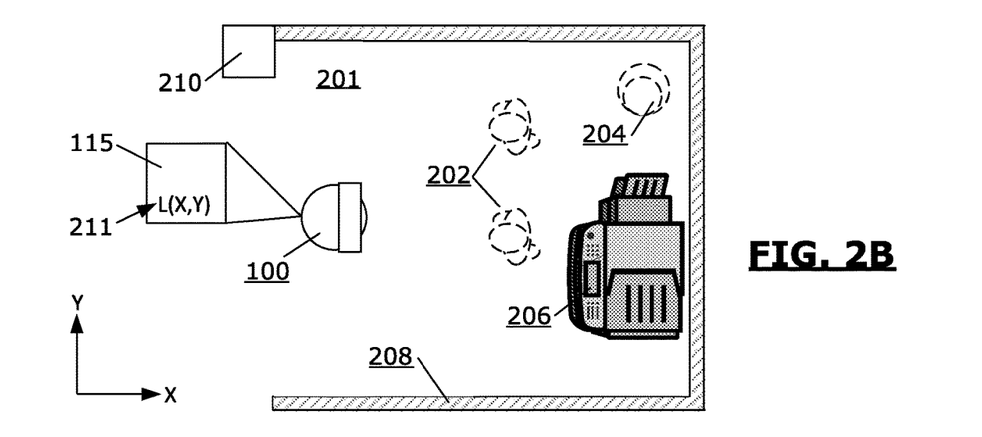
Figure 2C:
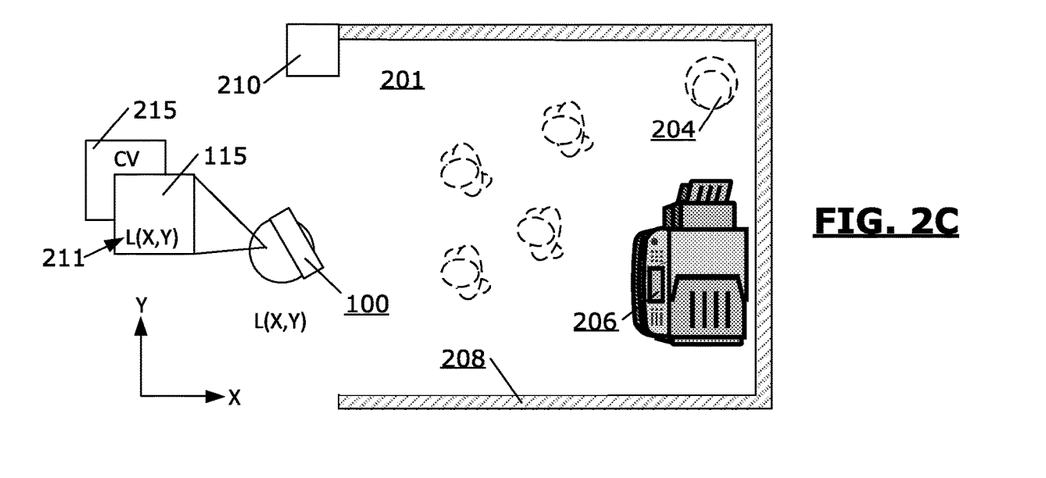

FIGS. 2A through 2C illustrate an example of the robot 100 generating a reference map 115 for a given region (e.g., room for dwelling). In FIG. 2A, the robot 100 positions itself at a known location 211 to capture image data from a scene. The image data may depict people 202, a wastebasket 204, a photocopier 206 and walls 208. The robot may capture the image data while tracking its own location, relative to a point of reference 210 or reference frame.

In FIG. 2B, the robot 100 generates the reference map 115 using the map logic 112 and the image data captured from the region 201. The robot 100 may exclude dynamic objects (e.g., people 202) and non-persistent objects (e.g., waste basket 204). The robot 100 may utilize a map generation process such as described with an example of FIG. 4A or FIG. 4B in order to identify the people 202 and wastebasket 204 as undesirable objects for the reference map 115. The reference map 115 may then depict a boundary of the photocopier 206.

In FIG. 2C, another robot (or alternatively, the same robot 100) may use the reference map 115 at a different time, in order to localize itself. The robot 100 may capture a current view 215 of the scene within region 201, and use the reference map 115 to identify which object of the scene to use for purpose of localization (e.g., the copier 206). The robot 200 may then triangulate depicted characteristics of the copier in the current view 215, with the reference map 115 in order to determine a relative location of the robot 200 with respect to the robot 100 that generated the reference map 115.

Figure 3:
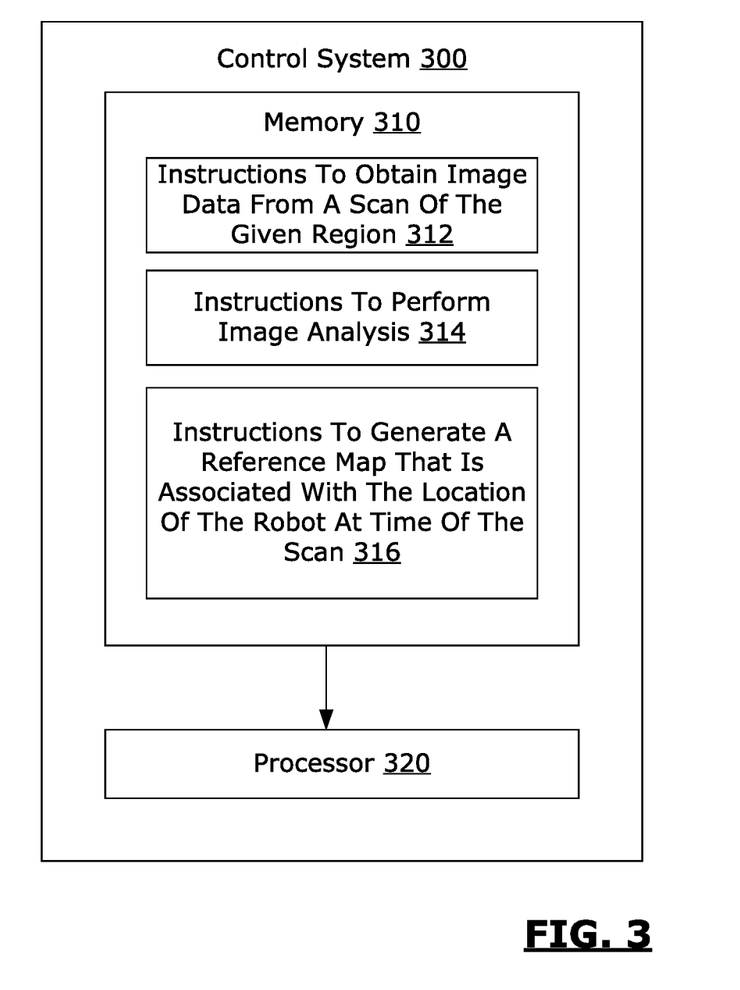
FIG. 3 illustrates an example control system for generating a reference map for use in localization.

FIG. 3 illustrates an example control system for generating a reference map that is associated with the location of the robot at the time of a scan. As described with some examples, a control system 300 may be implemented to use sensor data generated from the sensor set of a robot, such as described with an example of FIG. 1.

In FIG. 3, the control system 300 includes a memory 310 and a processor 320. The memory 310 can be of any form, including RAM, DRAM or ROM. The memory 310 can store instructions, such as through installation of software (e.g., an application). The processor 320 may access instructions from the memory 310 to control the robot 100. According to some examples, the processor 320 accesses multiple sets of instructions, including: (i) a first set of instructions 312 to obtain image data from a scan of a given region; (ii) a second set of instructions 314 to perform image analysis on the image data; and (iii) a third set of instructions 316 to generate a reference map that excludes the set of undesirable objects and is associated with the location of the robot at the time of the scan.

In some examples, the control system 300 can be implemented as an integral component of a working robot, such as for use with reference map building operations such robots routinely perform. For example, the control system 300 may execute the instructions 312-316 in real-time, as the robot traverses a given region to build the reference map. In variations, the control system 300 may be implemented as a remote or separate entity. For example, the control system 300 may receive sensor data that is transmitted from the robot 100 using, for example, a wireless communication and/or network channel. In such examples, the control system 300 may generate a reference map of the given region using the transmitted sensor data, and then communicate a generated reference map back to the robot once it is generated or updated.

In variations still, the control system 300 may communicate the generated reference map to a different robot than the one which was used to obtain sensor data of the given region. For example, the control system may generate a reference map for a given region using a first robot, and communicate the generated reference map to a second robot, or alternatively, to a fleet of robots. As another example, the control system 300 can be implemented on either the robot 100 or on a remote entity, to receive the sensor data for the given region from another robot, or alternatively, from a sensory device or assembly.

The control system 300 may operate synchronously (e.g., in real-time) to build a reference map for localization purposes using sensor data that is being obtained from the sensor set of the robot. In variations, the instructions 312-316 may be implemented in part or entirety in an asynchronous manner. For example, in examples in which the control system is integrated with the robot 100, the robot 100 may execute instructions 312, 314 and/or 316 at a later time, when, for example, the robot has more computing resources available to it, or when the robot is offline. Likewise, in an example in which the control system 300 is remote or separate, the control system 300 may execute the instructions 312-316 independently of the operations of the robot.

Figure 4A:
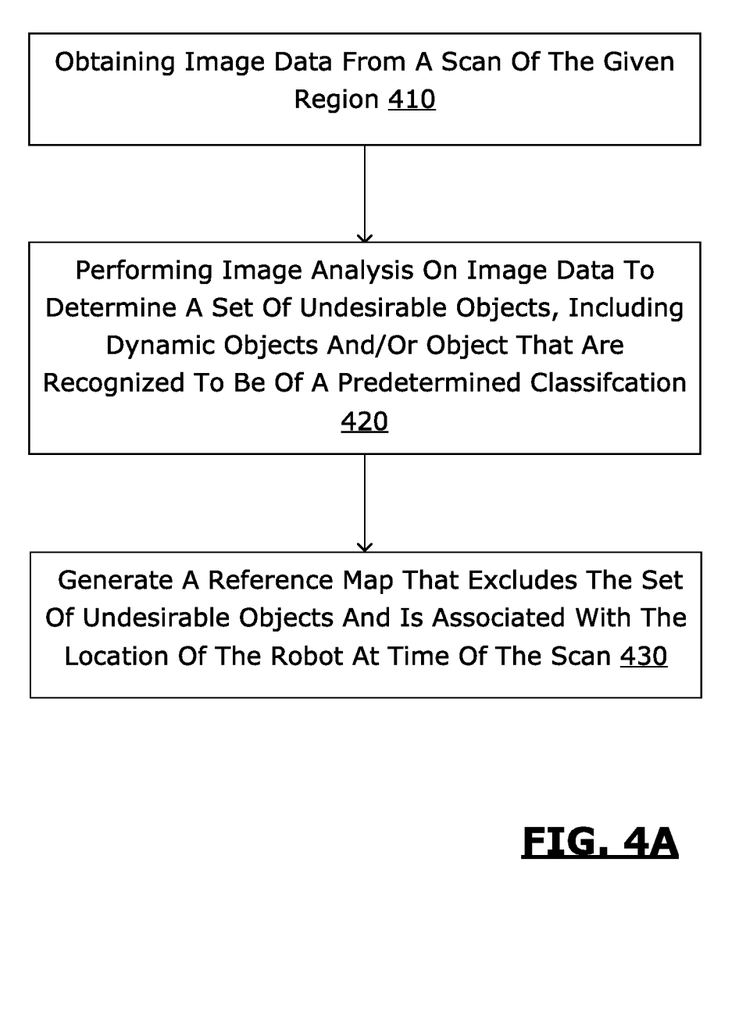
FIG. 4A illustrates an example method for generating a reference map for use in localization.

FIG. 4A illustrates an example method for generating a reference map that is associated with the location of the robot at the time of the scan. Example methods as illustrated with FIG. 4A and FIG. 4B, may be implemented using components illustrated with examples of FIG. 1 through FIG. 3. Accordingly, references made to elements of FIG. 1 through FIG. 3 are for purposes of illustrating a suitable element or component for performing a step or sub-step being described.

With reference to an example of FIG. 4A, image data is obtained from a scan of the given region (410). The image data may be obtained from, for example, a camera and depth (or distance) sensor, a LiDAR camera, a pair of stereoscopic cameras and/or combination thereof (collectively "image sensors"). In some variations, the image data is obtained in real-time, as for example, a robot that traverses the given region with onboard image sensors (the "sensing robot"). In variations, the image data is obtained from memory, some time period after the robot traverses the given region.

In some examples, the image data is processed by control system 300, residing on the robot which obtains the image data. In variations, the image data is obtained by the control system 300, residing on another robot that is in local communication (e.g., local wireless link) with the sensing robot on which the image data is obtained. Still further, the control system 300 which processes the image data may be a remote network computer, such as a server, in direct or indirect communication with the sensing robot.

Once the image data is obtained, image analysis may be performed to determine a set of undesirable objects. Image analysis may be performed on two-dimensional or three-dimensional images captured by the set of image sensors 150. The undesirable objects include dynamic objects and/or objects that are recognized to be of a predetermined classification (420). The image analysis that is performed by the control system 300 may include object detection and classification, where the object is classified by type, category or instance. Additionally, the classification used to determine when objects are undesirable for use in a reference map may be based on a determination of permanency. For example, objects may be undesirable for the reference map if they are deemed to be dynamic (e.g., in motion), inherently dynamic, or unfixed (e.g., not persistently located). In some examples, objects may be recognized by type (e.g., chair, table, etc.) and the classification of permanency may be based on predetermined characteristics associated with the object type.

In variations, the object classification may provide for performing image analysis to classify objects into discrete categories or groups based on similarity. Groupings of similar objects may be used to define any one of multiple classification schemas, which over time can define classifications, along with a permanency characteristic that reflects whether the object is fixed or unfixed, as well as other more granular classifications.

Some variations provide for the assignment of objects to classifications, categories or groups to be implemented as a probability. The object's classification may be based on a confidence score or value (e.g., value between 0.0 and 1.0) which can represent a confidence level as to the likelihood that the classification is correct. Thus, for example, the object's classification for an object that is classified as being fixed may reflect a confidence value as to whether the object may be moved in the future.

As described with some examples, a dynamic object may be one that is detected as being in motion when the given region is being sensed. To identify such objects, the control system 300 may compare image data of a captured scene over multiple, closely-spaced time intervals. If an object is detected as being present in one region of a captured scene in one time interval, and present in another region of the captured scene in another time interval, then the object may be identified as dynamic because it is in motion while the given region is being sensed.

While time-based object detection may be used to detect such dynamic objects, some examples may also utilize object classification, where a detected object is determined to be of a particular category type based on detected characteristics of the object as depicted in a captured scene. In such cases, the detected object may be identified as being dynamic, even though the object is not in motion when the given region is being sensed. For example, a cat may lay still for a duration of time while a given region is being sensed, but the control system 300 may still recognize the cat for what it is, and identify it as a dynamic object.

In similar fashion, object classification may also be used to identify other objects that are deemed undesirable for purposes of map generation. Such objects may have a characteristic of being inherently static, but not persistently-positioned (e.g., static and in the same location over an extended duration of time). Such undesirable objects may include objects which can readily be moved by contact with a dynamic object. For example, a desk chair in a room may be static, but likely to move over time. A large table, on the other hand, can be assumed as being static and persistently-positioned within in the same room. The control system 300 may perform analysis on image data depicting such objects, to identify physical characteristics (e.g., shape, signature features, etc.) that are characteristic of an object type or category. Based on the determined object type or category, the determination may be made by the control system 300 to identify the object as being undesirable for purposes of map generation.

The control system 300 may generate a reference map that excludes the set of undesirable objects and is associated with the location of the robot at the time of the scan (430). The generation of the reference map for a given region may encompass an initial mapping process or activity, as well as subsequent activities that may result in the map of the given region being updated. In particular, examples recognize that map updates can be made when the robot senses a given region for any task or activity, and encounters an object that is unknown, or otherwise unexpected as to its location.

In performing the image analysis, the control system 300 may utilize a library of models, ground truth data, and/or templates, identifying types, categories and subcategories of objects. The library of models, ground truth data and/or templates may also be updated with repeated uses of the robot within a given region. According to some examples, the library that is maintained for purposes of image analysis can be updated with objects that a robot encounters over time, within a given region. Additionally, the robot may utilize the image library when the robot is operating in a given region for purposes other than generating a reference map (e.g., sweeping, vacuuming, delivering a package, etc.). In particular, the robot may maintain a library of undesirable objects, and when the robot traverses a given region and encounters an unexpected object, the control system 300 may perform image analysis to compare the object with a collection of undesirable objects that have previously been encountered and classified by the robot. To perform such comparison, the control system 300 may perform object classification and/or recognition (e.g., detect signature feature of object, and compare signature feature to signature features of other objects encountered in the given region over time). If the robot does not recognize an unexpected object as being an object that it has previously recognized, the robot may reclassify the object by type (e.g., a table or chair), and make a further determination as to whether the object is undesirable based on the determination of object type. Thus, examples recognize that a robot may update a reference map of a given region at any time when the robot is deployed, to identify newly encountered objects and to identify such objects as being undesirable (e.g., dynamic or not persistently static) or desirable (e.g., persistently-positioned) for purpose of map generation.

Additionally, in some examples, the control system 300 may update the models, ground truth data and template images that are used to designate objects as being desirable or undesirable, for the purpose of reference map generation. For example, if a robot repeatedly encounters an object that is designated as being undesirable for reference map generation, but then detects the object as being static in its position over an extended duration of time, then the control system 300 may re-designate the object and include the object in an updated version of the given region's map. The re-designation of the object may coincide with the control system 300 reclassifying the encountered object to be of a different object type than a previous object type classification, where the reclassified object type is known to be static and persistently-positioned. By way of example, a robot may initially map a room and identify a table as being undesirable, based on the size of the table and/or its legs (e.g., card table). However, if the robot repeatedly encounters the table legs in the same position over an extended period of time, then the control system 300 may reclassify the object as being of a type that is static and persistently-located (e.g., table fixture). In such cases, the control system 300 may update the reference map of the given region to include the table.

Conversely, if the robot identifies a particular object as being of a type that is static and persistently-positioned (e.g., a table), such that the object is included in the map, but subsequently detects the object as having been moved, then the control system 300 may reclassify the object as being of a type that is undesirable, so that it is excluded from the reference map. Alternatively, the control system 300 may designate the object type of the displaced object as being undesirable, such that if the robot encounters other objects of similar appearance, those objects will also be designated as undesirable, and excluded from the reference map of the given region.

Figure 4B:
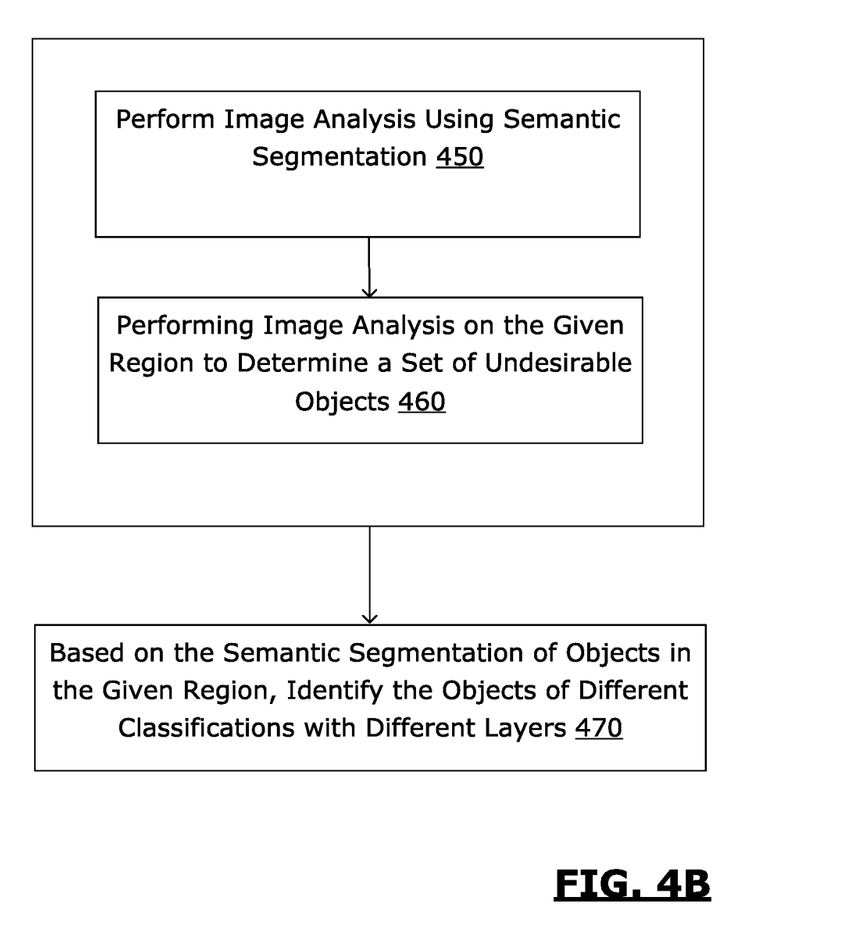
FIG. 4B illustrates an example method for performing image analysis using semantic segmentation to generate a reference map that excludes undesirable in the current image from being depicted as part of the map.

With reference to FIG. 4B, the control system 300 may perform object detection and classification on image data that depicts a given region, in order to identify undesirable objects for purposes of reference map generation of that region (460). In performing object classification, the control system 300 may use a semantic segmentation process or technique (450). In such process, a pixel by pixel analysis is performed to segment a detected object depicted within an image into the foreground. Once segmented, the control system 300 may identify a shape or perimeter feature of the segmented object. The control system 300 may then compare the detected shape or perimeter feature to a library of models and templates in order to identify a matching object type.

As described with some examples, the library of models and templates may be based in part on historical data, corresponding to images that have previously been processed and designated as desirable or undesirable, based on images previously captured by the robot.

In some examples, the classification scheme may designate objects as being one of static and persistently-located, undesirable or dynamic. The control system 300 may determine a classification of a newly detected object by comparing the segmented object to templates or model images of previously encountered objects. If a newly encountered object is deemed to sufficiently match in appearance to a previously classified object, then the classification of the prior object may be designated for the newly encountered object. Over time, the control system 300 may reclassify objects, based on what the robot senses in a given region.

In some variations, a confidence score is associated with the matched object type, and when multiple object types are possible, the confidence score may be utilized to select the best suited object type. For purpose of reference map generation, an object may be designated as undesirable if it meets a threshold level of confidence with respect to the detected object type.

The control system 300 may also associate objects of different classifications with different layers (470). For example, when objects are classified by permanency, different object permanency classifications may be associated with different layers. Furthermore, the control system 300 may activate different layers so that the reference map depicts only the selected layer, corresponding to a given classification (e.g., objects of corresponding permanency classification or by user-defined classification). Based on the determined layer, the control system 300 may perform object classification and/or recognition, to compare the object to other objects of the same layer and/or type.

Figure 5:
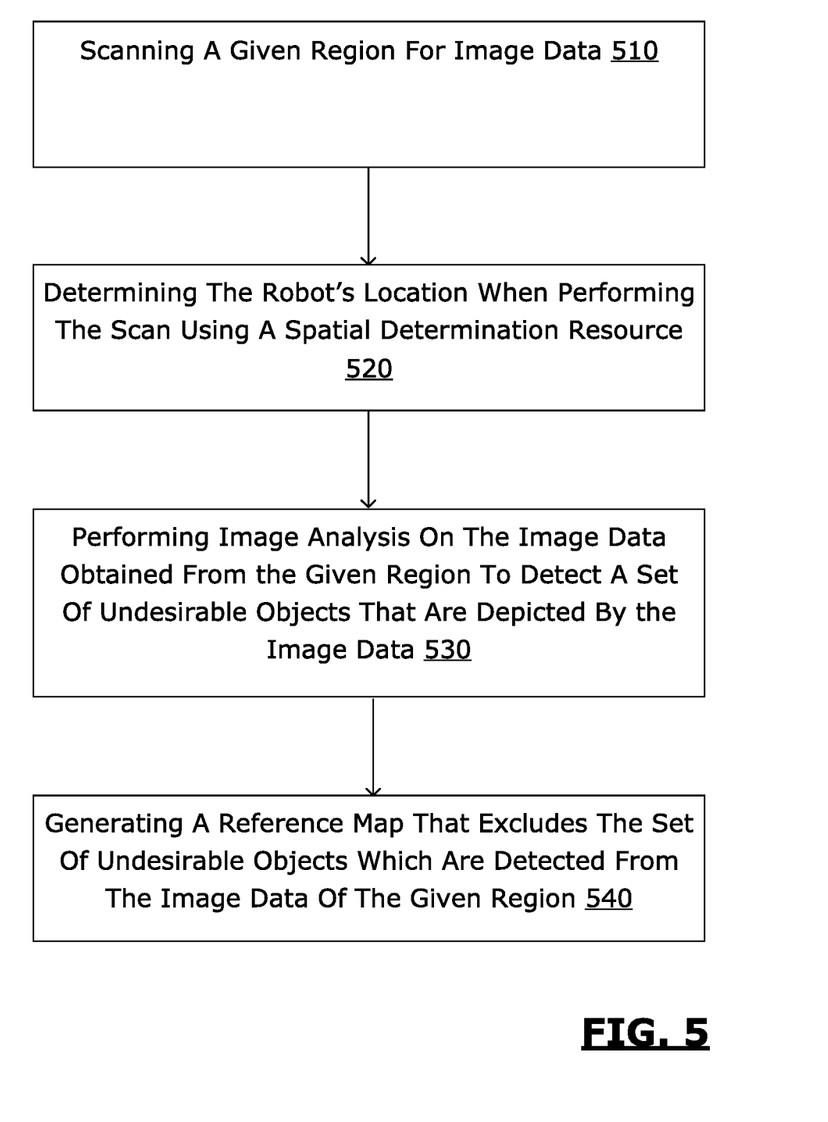
FIG. 5 illustrates an example method for operating a robot to generate a reference map.

FIG. 5 illustrates a method for operating a robot to generate a reference map. A method such as described with an example of FIG. 5 may be implemented using, for example, an example robot such as described with an example of FIG. 1. Accordingly, reference may be made to elements of FIG. 1 for purpose of illustrating suitable components for performing a step or sub-step being described.

With reference to an example of FIG. 5, a robot may operate to scan a given region for image data (510). For example, the robot 100 may obtain image data using a set of image sensors, such as provided by a two-dimensional camera(s) (e.g., camera with wide-eye lens, fish eye lens) and/or a three-dimensional image sensor(s) (e.g., LiDAR sensor, a stereoscopic camera pair, and/or a camera with a distance sensor).

The robot 100 may determine its location when performing the scan using a spatial determination resource 152 (520). The spatial determination resource 152 may correspond to, for example, a sensing mechanism to detect a point of reference (e.g., visual marker). The spatial determination resource 152 resource may include, for example, a movement sensor, such as an accelerometer and/or gyroscope. As an addition or alternative, the spatial determination resource 152 may include an odometer. By way of example, the robot 100 may detect its initial location with respect to the point of reference, using the corresponding sensing mechanism. The robot 100 may track its own movements with the given region using the odometer for linear distance, and the accelerometer and/or gyroscope to detect lateral motion and directional changes. By tracking its own motion with reference to a point of reference, the robot 100 may determine its location at the time the robot performs a scan.

In some examples, the robot 100 performs image analysis on the image data obtained from the given region to detect a set of undesirable objects that are depicted by the image data (530). The undesirable objects may correspond to objects that have a permanency classification that is indicative of the respective object being dynamic, or not persistently positioned (e.g., object can be moved by another object). Thus, the image analysis may identify objects that are dynamic, inherently not persistent in its location, or otherwise undesirable for purpose of localization or mapping.

The robot 100 generates a reference map 115 that excludes the set of undesirable objects which are detected from the image data of the given region (540). The reference map may be associated with the location of the robot 100 at the time of the scan. In this way, the reference map 115 can subsequently be used to localize the robot (or another robot), based on the location of the robot 100 at the time of the scan, and the objects depicted or otherwise represented in the reference map.

In some examples, the reference map is generated using a simultaneous localization and mapping ("SLAM") algorithm, or similar algorithm, for mapping an unknown environment while simultaneously keeping track of a robot's location within the environment.

While some examples provide for a robot to perform the image analysis to detect the set of undesirable objects, other examples (such as described with FIG. 3) may utilize a control system that is separate or remote from the robot 100. Likewise, a separate or remote computer may generate the reference map based on the exclusion of the detected set of undesirable objects.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mention of the particular feature. Thus, the absence of describing combinations should not preclude having rights to such combinations.

What is claimed is:

1. A robot comprising:
a set of image sensors;
a spatial determination resource;
a control system; and
a propulsion mechanism;
wherein the control system:
  performs a scan of a given region to obtain image data of the given region using the set of image sensors;
  determines, using the spatial determination resource, a location of the robot relative to at least one reference point at a time of the scan;
  performs image analysis on the image data to detect a set of undesirable objects that are depicted by the image data, the set of undesirable objects being determined based on permanency classifications for object types detected in the image data, the set of undesirable objects being at least one of a dynamic object or a predetermined category of undesirable objects;

generates a reference map that excludes the set of undesirable objects, the reference map being associated with the location of the robot at the time of the scan, and performs a localization operation to determine a location of the robot at a time after the time of the scan, the localization operation performed based on the reference map relative to the at least one reference point and a desirable object identified in the reference map, wherein the desirable object is at a first fixed location and wherein the at least one reference point is at a second fixed location different from the first fixed location and different from the location of the robot at the time of the scan.

2. The robot of claim 1, wherein the spatial determination resource includes a movement sensor.

3. The robot of claim 1, wherein the spatial determination resource includes an odometer.

4. The robot of claim 1, wherein the control system repeatedly performs a scan of the given region as the control system operates the propulsion mechanism to move the robot within the given region.

5. The robot of claim 1, wherein the control system detects multiple objects within the given region that includes the set of undesirable objects, and determines a bounding region for each of the detected objects.

6. The robot of claim 1, wherein the control system performs image analysis using semantic segmentation.

7. The robot of claim 1, wherein the control system performs image analysis to determine a plurality of objects, including the set of undesirable objects.

8. The robot of claim 1, wherein the reference map is layered to identify object of different categories in different layers.

9. The robot of claim 1, wherein the control system is to:
detect objects in the image data by object type; and
classify the permanency of the objects based on the detected object type.

10. The robot of claim 1, wherein the control system is to determine that a detected object is an undesirable object for the reference map in response to determining that the detected object is of an object type that is likely to move.

11. The robot of claim 1, wherein the control system is to determine that a detected static object in the image data is an undesirable object for the reference map in response to determining that the detected static object is likely to be moved by contact with a dynamic object.

12. The robot of claim 1, wherein the control system is to reclassify a repeatedly encountered object from undesirable to desirable for the reference map in response to determining that the repeatedly encountered object remains static and persistently-positioned over a period of time.

13. The robot of claim 1, wherein the control system is to reclassify a repeatedly encountered object classified as static and persistently-positioned from desirable to undesirable for the reference map in response to detecting that the repeatedly encountered object moves.

14. A control system comprising:
a memory to store instructions; and
at least one processor to execute the instructions to:
obtain image data of a given region, the image data obtained from a scan of the given region by multiple sensors provided on a robot;
perform image analysis on the image data to determine a set of undesirable objects, the set of undesirable objects being determined based on permanency classifications for object types detected in the image data, the set of undesirable objects being at least one of a dynamic object or a predetermined category of undesirable static objects;
generate a reference map that excludes the set of undesirable objects, the reference map being associated with a location of the robot at a time of the scan, and
perform a localization operation to determine a location of the robot at a time after the time of the scan, the localization operation performed based on the reference map relative to at least one reference point and a desirable object identified in the reference map,
wherein the desirable object is at a first fixed location and wherein the at least one reference point is at a second fixed location different from the first fixed location and different from the location of the robot at the time of the scan.

15. The control system of claim 14, wherein the at least one processor executes the instructions to repeatedly perform a scan of the given region as the robot moves within the given region.

16. The control system of claim 15, wherein the at least one processor executes the instructions to determine the location of the robot relative to at least one of a first reference point or a second reference point for each of the scans.

17. The control system of claim 14, wherein the at least one processor executes the instructions to detect multiple objects within the given region that includes the set of undesirable objects, and determine a bounding region for each of the detected objects.

18. The control system of claim 14, wherein the at least one processor executes the instructions to perform image analysis using semantic segmentation.

19. The control system of claim 14, wherein the at least one processor executes the instructions to perform image analysis to determine a plurality of objects, including the set of undesirable objects.

20. A method for operating a robot, the method comprising:
obtaining image data from a scan of a given region;
performing image analysis on the image data to determine a set of undesirable objects, the set of undesirable objects including at least one of a dynamic object or a predetermined category of undesirable objects, the set of undesirable objects being determined based on permanency classifications for object types detected in the image data;
generating a reference map that excludes the set of undesirable objects, the reference map being associated with a location of the robot at a time of the scan, and
performing a localization operation to determine a location of the robot at a time after the time of the scan, the localization operation performed based on the reference map relative to a reference point and a desirable object identified in the reference map,
wherein the desirable object is at a first fixed location and wherein the reference point is at a second fixed location different from the first fixed location and different from the location of the robot at the time of the scan.

* * * * *